Figure 1:
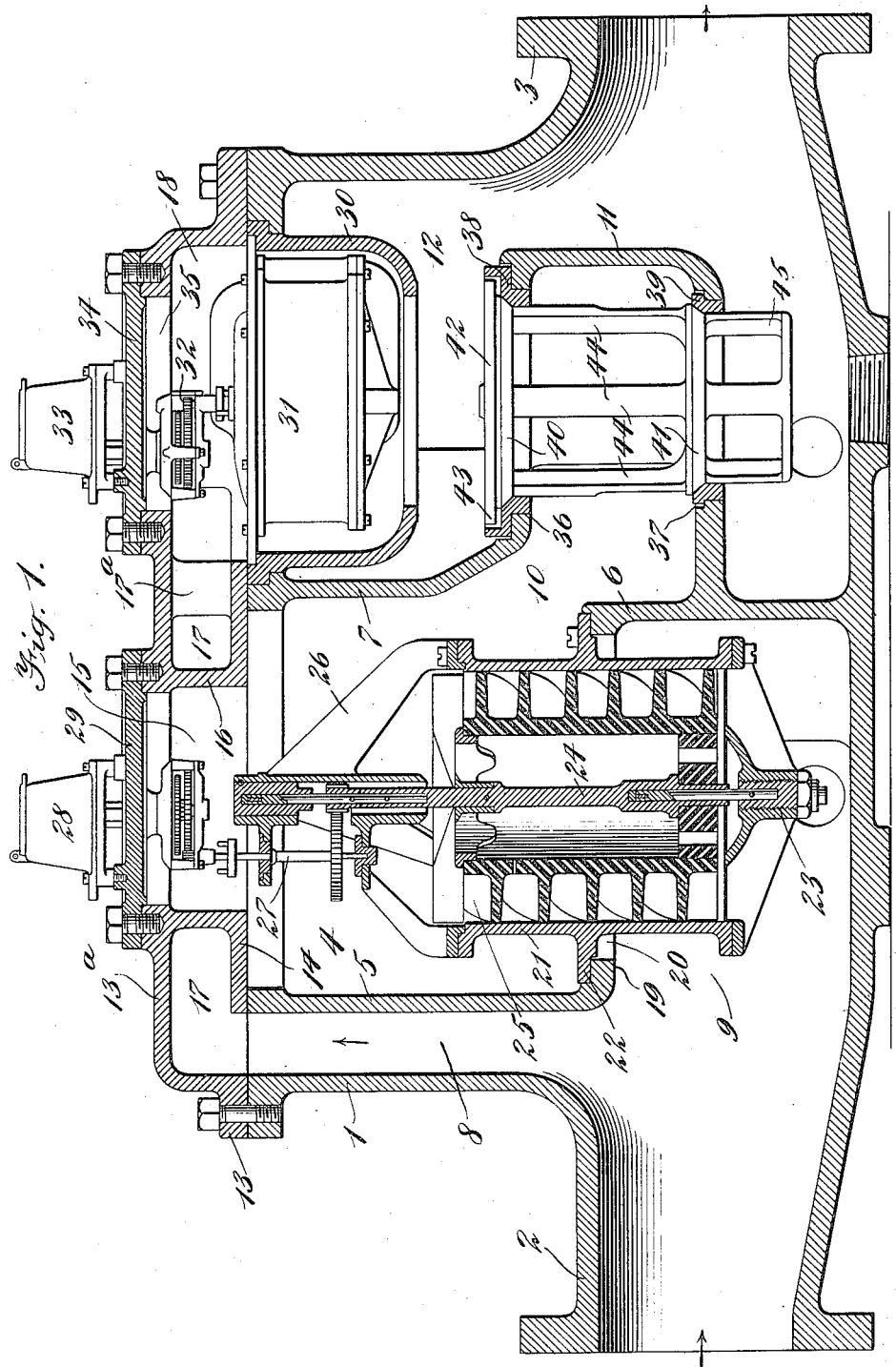

L. H. NASH.
WATER METER.
APPLICATION FILED JUNE 28, 1911.

1,150,955.

Patented Aug. 24, 1915.
2 SHEETS—SHEET 1.

Witnesses:

Lewis Hallock Nash, Inventor
By his Attorney Gifford Bull

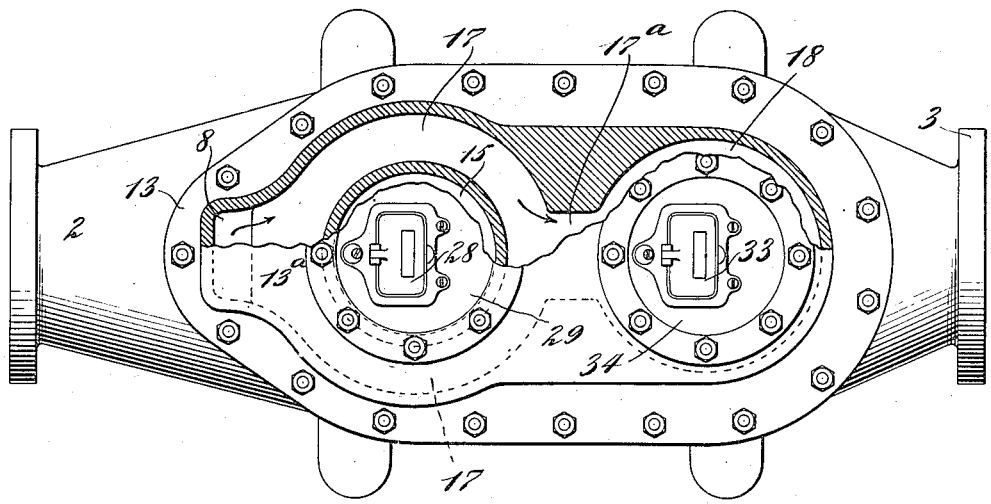
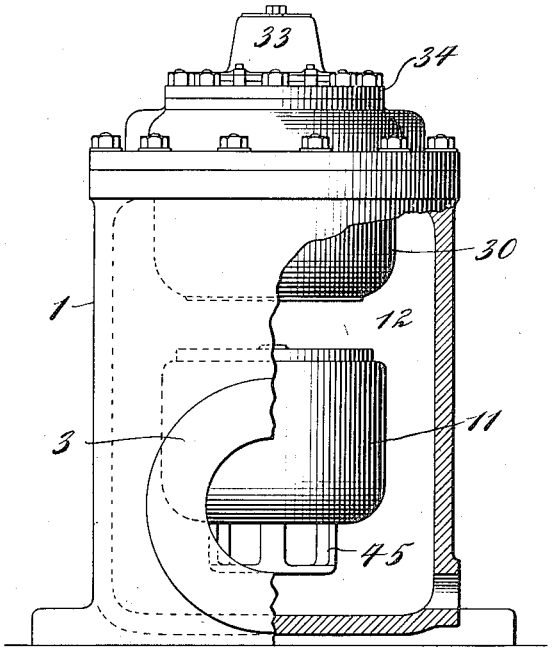

UNITED STATES PATENT OFFICE.

LEWIS HALLOCK NASH, OF SOUTH NORWALK, CONNECTICUT.

WATER-METER.

1,150,955.

Specification of Letters Patent.

Patented Aug. 24, 1915.

Application filed June 28, 1911. Serial No. 635,811.

*To all whom it may concern:*

Be it known that I, LEWIS HALLOCK NASH, a citizen of the United States, and a resident of South Norwalk, in the county of Fairfield and State of Connecticut, have invented certain new and useful Improvements in Water-Meters, of which the following is a specification.

My invention relates to improvements in water meters of that general character or type adapted to be interposed in a conduit or main to measure the amount or rate of flow of liquid through the same.

The present invention has particularly to do with that type of meters known as "combination meters", which type includes a plurality of measuring and registering devices, one of which measures the low rates of flow, while another will become effective to measure the rate of flow only when the latter exceeds the capacity of the meter measuring the low rate.

The invention consists in the improved combination and arrangement of parts and mechanisms in operative combination to be fully described hereinafter and the novelty of which will be particularly pointed out and distinctly claimed.

I have fully and clearly illustrated my invention in the accompanying drawings to be taken as a part of this specification, and wherein, Figure 1 is a view in longitudinal vertical section through a mechanism or structure embodying my invention; Fig. 2 is a top plan view with parts broken away to disclose the interior of a portion of the meter; Fig. 3 is a view in end elevation with parts broken away to disclose the interior of the meter.

Referring to the drawings by characters of reference, 1 designates a casing which may be in general construction of any desired form which will satisfy the requirements and conditions under which the meter is to be employed. Preferably it consists of a casting substantially elliptical in plan view, and provided at its opposite end portions with necks or extensions 2, 3, adapted to be connected in any suitable manner to the parts of the pipe or conduit through which the flow takes place which is to be measured, the extension 2 constituting the inlet to the casing and the extension 3 the outlet.

Located within the casing is a chamber or passage 4 formed by vertical transverse walls 5, 6 and 7 connecting the side walls of the casing, the wall 5 being spaced from the end wall of the casing at the inlet to provide a passage 8 for a purpose to be presently described. The wall 5 extends from the top of the body of the casing to a point short of the bottom wall of the latter to provide a passage 9, the walls 6 and 7 being connected to the top and bottom walls respectively of the casing and terminating short of each other to provide a passage 10, said passage opening into an extension 11 of the chamber 4. The partition 7 heretofore referred to, and the partition 6 with the extension 11, divide the casing into two chambers or passages 4 and 12, the former of which is adapted to contain measuring mechanism for large flows or velocities, and the second of which contains a mechanism for small flows or velocities.

Extending over the casing is a closure plate 13 consisting of upper and lower webs 13ª, 14, respectively, through which is a passage 15 which is defined by a web 16 uniting said webs 13ª, 14 and forming a passageway from a point exterior of the casing to the interior of the chamber 4. Around the wall or web 16 are oppositely disposed passages 17, 17 which unite at one end, and when the closure plate is in place register at their point of union with the passageway 8. The passages 17, 17 and 15 are located over the chamber 4, and said passageways 17 unite at a point intermediate the ends of the closure as at 17ª where they open into a chamber 18 located over the chamber 12 of the casing. By this arrangement as hereinafter described water may flow to the casing up the conduit 8, through the conduits 17, 17 and into the chamber 18 without passing through the chamber 4 and affecting the measuring mechanism associated therewith as will be hereinafter set forth.

I will now proceed to describe the construction and arrangement of the measuring and registering mechanisms, in so far as it may be necessary to complete understanding of the invention. The lower end of the wall 5 and the upper end portion of the wall 6 are connected by a horizontal partition 19 having an opening 20, through which extends a cylindrical open-ended barrel 21 having an intermediate annular collar 22 adapted to rest on the said partition 19, whereby the barrel is vertically supported upon said partition, the ends of the barrel respectively projecting into the chamber 4 and into that portion of the casing below the partition 19. Supported by the lower portion of the barrel 21 is a bearing 23 for the shaft 24 of the screw 25, the upper end of said shaft having a bearing in a structure 26 supported by the upper end of said barrel. At this upper end the shaft 24 of the driving screw 25 is geared by suitable gearing, indicated generally at 27, to register mechanism 28 which is supported on a cap plate 29 closing the passageway 15 heretofore described.

The specific construction of the measuring mechanisms and the meter mechanisms described is immaterial and I therefore do not deem it necessary to enter into a detailed description or illustration of the same as it is believed my invention will be fully understood without such detailed disclosure. Supported in the upper open end of the body of the casing over the chamber 12 is an annular partition 30 supporting the measuring mechanism 31 of the low capacity meter, which mechanism is geared through gearing 32 to register mechanism 33 supported upon the upper face of a cap plate 34 closing an opening 35 in the plate 13 over said measuring mechanism. By this arrangement the water which flows up the passage 8 and by way of the passages 17, 17 into the chamber 18 will pass through the measuring mechanism of the low capacity measuring mechanism and then to the outlet side of the main casing. The chamber extension 11 is formed with upper end lower horizontal walls having alining openings 36, 37, in which respectively are seated annular conical valve seats 38, 39, the opening through the valve seat 38 being larger than the opening through the seat 39 for a purpose to be presently described. Operating upon these valve seats 38, 39 are the valve plates 40, 41 of a differential, pressure operated valve which may be of the "double beat" type. The area of the face of the upper valve plate within the chamber 11 and the area of the corresponding face of the lower valve plate are the same, but the effective area of the upper plate to pressure within the chamber 11 is increased by the addition of the conical face of the upper valve, substantially half the area of which is subjected to pressure, as is well known in this type of valve. The upper valve plate carries a superposed plate 42 having an overhanging or extending flange 43 in order to increase the area of the upper valve under conditions to be presently set forth. As is usual with "double beat" valves the heads are connected by guiding and spacing bars 44 which maintain the valves centered on their seats and guide them in their up and down movements. The bottom valve may also be provided with the usual cage 45 to guide it in its movement.

In service, the parts being arranged and constructed as described the operation of the invention is as follows, it being understood that the measuring mechanism operating within the chamber 4 is intended to measure large rates or high velocities of flow, while the meter in the chamber 12 is to measure lower rates of flow or velocities. The water entering the inlet 2 of the meter will flow up the passageway 8 and also through the barrel 21, and if it is of a rate of flow which is to come within the capacity of the smaller meter the water will flow through the barrel and will fill the chamber 4 and its extension 11, and in addition the water will pass up the passage 8 through the passages 17 into the chamber 18 and through the measuring mechanism 31, under which conditions the pressure in the chamber 11 is not sufficient to overcome the weight of the valve, and the pressure in the chamber 12, and to lift said valve from its seat, whereby as soon as the chambers 4 and 11 are filled the measuring mechanism in the chamber 4 will cease to operate and only the water passing up the passage 8 thence through the passages 17 and chamber 18 to the small meter will be measured, and this continues as long as the pressure in the chamber 11 is too low to lift the valve.

Should the rate of flow or the velocity increase beyond the capacity of the small meter it will be understood that there will be an increase in pressure within the chamber 4 and its extension 11 which will serve to lift said valve plates from their seats. As soon as the upper valve starts to move from its seat the area of the overhanging portion 43 will be subjected to the pressure in the chamber 11 and the valves will thereby be quickly and sharply opened to permit free flow through the chamber 4. This raising of the valve will permit a free flow of water upward through the barrel 21, which will serve to rotate the screw 25 to drive the register mechanism 28 so that the two register mechanisms work together and their combined totals will show the total flow as long as the pressure is sufficient to maintain the "double beat" valve in open position. When the valve is open, in addition to the difference in area between the valve plates exposed to the chamber pressure, the upper plate will have added to it the area of the under face of the plate 43 so that the valve is held positively open and will not close to slight differences in pressure which would not be sufficient to warrant the cessation of the operation of the larger meter. The upward movement of the valve to open position is limited by the depending lower edge of the chamber 30 so that the valve cannot be lifted high enough to dislodge the lower end of the same from the seat 39. This combined operation of the two measuring mechanisms continues as long as the velocity of the flow is high enough to maintain the valves 40 and 41 open, but as soon as the pressure drops to a point where the pressure in the chamber 11 is insufficient to hold the valves open, the valves will be seated so as to cut off the flow through the chambers 4 and 11, which will result in the stopping of the operation of the measuring mechanism for the high rates of flow, the small meter continuing to operate to measure the flow through the casing.

What I claim and desire to secure by Letters Patent of the United States is:—

1. In a combination meter, a casing having two passages open to the same supply, a measuring mechanism in each passage, one of said passages being normally open to permit continuous flow therethrough, the other passage having a chambered extension projecting into the passage of continuous flow, said extension being provided with oppositely disposed valve seats, connected valve plates coöperating with said seats and having differential areas within the extension, and one of said valve plates having an increased area available to the pressure in the extension when the valves are moved to open position.

2. In a combination meter, a casing having two passages, a measuring mechanism in each passage, independent passageways for conducting fluid from a common source to said passages, one of said passages being unobstructed at all times for the free flow of the fluid therethrough, and a differential valve controlling the flow through the other of said passages and exposed to the pressures within both of said passages.

3. In a combination meter, a casing having two passages, a measuring mechanism in each passage, independent passageways for conducting fluid from a common source to said passages, one of said passages being unobstructed at all times for the free flow of the fluid therethrough, and a differential double beat valve controlling the flow through the other of said passages and exposed to the pressures within both of said passages.

In testimony whereof I have hereunto signed my name in the presence of two subscribing witnesses.

LEWIS HALLOCK NASH.

Witnesses:
  M. E. McNinch,
  C. G. Heylmur.